Dec. 17, 1957  J. B. PRATHER  2,816,438
APPARATUS FOR TESTING HARDNESS OF INSIDE SURFACES
Filed June 3, 1954
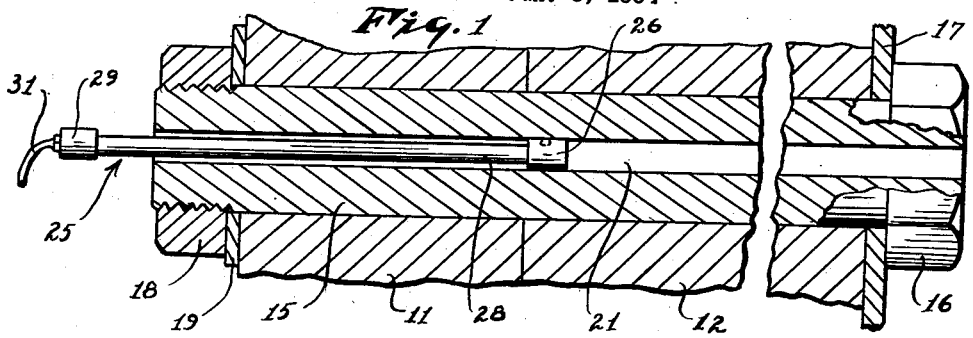
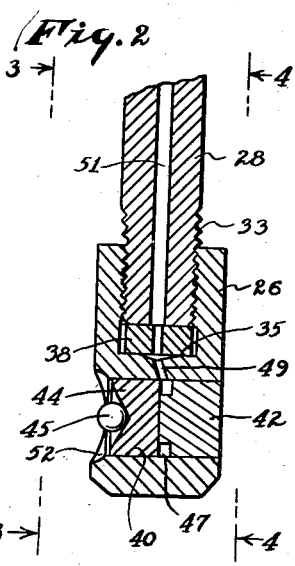
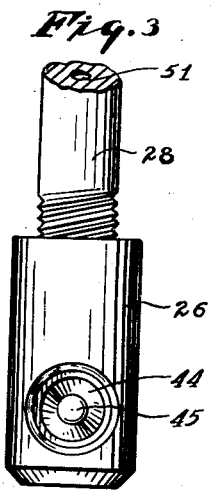
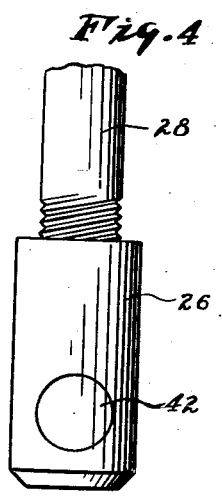
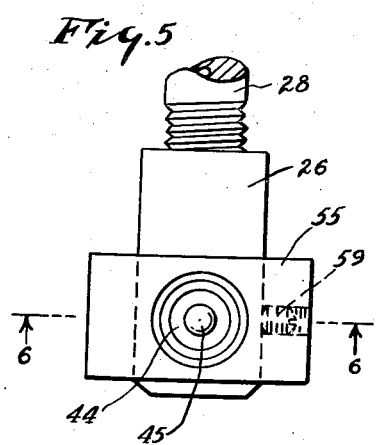
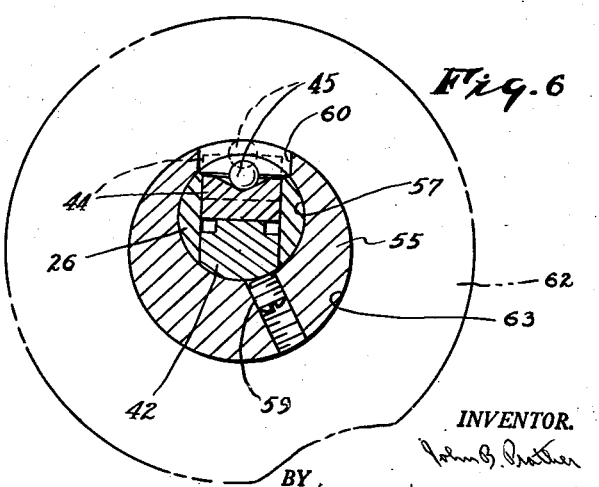
INVENTOR.
John B. Prather
BY Emery, Varney,
Whittemore & Dix
ATTORNEYS

United States Patent Office 2,816,438
Patented Dec. 17, 1957

2,816,438
APPARATUS FOR TESTING HARDNESS OF INSIDE SURFACES

John B. Prather, Yonkers, N. Y.

Application June 3, 1954, Serial No. 434,266

3 Claims. (Cl. 73—81)

This invention relates to apparatus for testing the hardness of inside surfaces, such as the hardness of the inside surface of a bolt which has a longitudinal bore extending therethrough.

With certain kinds of equipment which are subject to continued operation at high temperature, the bolts fail from embrittlement after extended service. Prior to such failure, there is a gradual hardening of the bolt and it is possible to tell whether bolts are in danger of such failure by periodically testing the hardness of the bolts. This has been done by dismantling the equipment after a period of service, for example, after every two years of operation.

The cost of dismantling heavy equipment, such as that used in power generating stations, is considerable; and it is an object of this invention to provide apparatus for testing the hardness of the bolts without dismantling the equipment. The outside surfaces of the bolts are not accessible for testing, but with this invention special equipment is provided for testing the bolts from the inside of longitudinal bores extending lengthwise through the bolts. This invention makes it possible to test the hardness at regions midway between the ends of the bolt where there is likely to have been the highest temperatures so that danger of excessive hardness is greater than at the ends of the bolt.

The invention can be used for testing the hardness of other inside surfaces, and in its broadest aspects, it is an object of the invention to provide improved means for testing the hardness of interior surfaces. Another object is to provide means for making such tests with apparatus that is highly accurate, simple, rugged and convenient to use, so that the cost of making the hardness determinations is kept to a low value.

Other objects, features and advantages of the invention will appear or be pointed out as the description proceeds.

In the drawing, forming a part hereof, in which like reference characters indicate corresponding parts in all the views;

Figure 1 is a view, mostly in section, showing a bolt in assembled relation with the equipment which it secures, and with the hardness tester of this invention inserted into the bolt for testing the hardness at a region intermediate to the ends of the bolt;

Figure 2 is a greatly enlarged sectional view through the hardness tester of Figure 1, with the tester turned into a vertical position;

Figure 3 is a front elevation of the hardness tester shown in Figure 2;

Figure 4 is a rear elevation of the hardness tester shown in Figures 2 and 3;

Figure 5 is a view similar to Figure 3 but with an adapter placed on the hardness tester for use in cylindrical openings of larger diameter; and Figure 6 is a sectional view taken on the line 6—6 of Figure 5.

Figure 1 shows two parts 11 and 12 of a generator or other equipment secured together by a bolt 15. The bolt has a head 16 which clamps against a washer 17; and there is a nut 18 threaded over the end of the bolt and clamped against a washer 19. A hollow cylindrical bore 21 extends through the bolt 15 and the axis of the bore 21 is preferably co-incident with the axis of the bolt 15. In the construction shown the bore 21 extends for the full length of the bolt, but this is not always the case.

If the bolt 15 hardens, as the result of being subjected to continued high temperature and other circumstances encountered in service, the change in hardness takes place throughout the full wall thickness around the bore 21 so that the hardness can be determined from the inside surface of the bore as well as from the outside of the bolt. Although the outside surface is not accessible, except by dismantling the equipment, the inside surface is accessible, though only with a very limited working space. Hardness testing equipment of the prior art has been unable to make tests on surfaces in spaces as confined as the interior of the bore 21; but this invention provides a special hardness tester 25 which has a housing 26 at one end small enough to fit into the bore 21. The housing 26 is attached to the end of a stem 28 which is long enough to reach any point within the bore 21, either by inserting the hardness tester from one end of the bolt or from the other.

A fitting 29 at the outer end of the stem 28, connects with a hose 31 leading to a pump from which oil or other hydraulic fluid is supplied to the hardness tester 25 under a controlled pressure. The instantaneous value of the pressure is indicated at all times by a suitable gage. Such apparatus for supplying hydraulic fluid is well known and its illustration is not necessary for a complete understanding of this invention.

Figure 2 shows the housing 26 attached to the end of the stem 28 by threads 33. The stem 28 fits into a counter bore in the head 26 and there is a shoulder 35 at the lower end of the counter bore. A gasket 38 is clamped securely between the end face of the stem 28 and the shoulder 35 at the bottom of the counter bore so as to prevent any leakage of hydraulic fluid along the threads 33.

A cylinder 40 extends transversely through the housing 26. This cylinder 40 is closed at its rearward end by a plug 42. There is a piston 44 in the forward end of the cylinder 40, and the outer face of the piston 44 is recessed to hold a penetrator, here shown as a hardened ball 45.

When in its retracted position, the piston 44 abuts against the forward end of the plug 42. There is an annular chamber 47 behind the piston 44 for receiving hydraulic fluid through a port 49 in the wall of the cylinder 40. This port communicates with a passage 51 extending through the stem 28. In the construction illustrated, the annular chamber 47 is formed by providing a cut away corner around the forward end of the plug 42, but other expedients can be used for admitting work fluid into the cylinder 40 between the plug 42 and the piston 44.

At its outer end, the cylinder 40 has a flared entrance 52; and when the piston 44 is fully retracted, the outer limit of the penetrator 45 is substantially in line with the front surface of the housing 26. The outside diameter of the housing 26 is substantially equal to the inside diameter of the bore in which the hardness test is to be made. It is preferable to have just a running clearance for the housing 26 in the bore, but the apparatus can be used even though it fits somewhat more loosely in the bore where the test is to be made. The penetrator may either be held in position with a clip or it may be solidly attached to the piston 44 or be an integral part of the piston. Also, it is a feature of the invention that the rearward side of the housing 26, including the back of the plug 42, abuts against one side of the cylindrical bore while the penetrator ball 45 is being forced into the surface on the other side of the bore.

Since the stroke of the piston 44 is quite limited, it is evident that the apparatus shown on Figure 2 cannot be used alone to test the hardness of an inside bore which is much greater in diameter than the housing 26.

In order to make it possible to use the apparatus with bolts, or other elements, having widely different diameters of the openings within which the hardness tests are to be made, adapters are provided for increasing the effective diameter of the housing 26. Figure 5 shows an adapter 55. This adapter has an opening 57 (Figure 6) into which the housing 26 fits snugly. A set screw 59 fits within a threaded opening through the adapter 55 and can be screwed into contact with the housing 26 to hold the adapter and housing securely connected together.

The longitudinal axis of the adapter 55 is parallel to that of the housing 26, but the opening 57 is eccentric in the adapter 55 because it is important to have the front of the housing 26 close to the surface of the bore in which the test is to be made. When using the adapter 55, the back of the housing 28, including the plug 42, abuts against the rearward inside wall of the opening 57 in the adapter 55, and the piston 44 forces the penetrator ball 45 into contact with the wall of the large diameter bore in the same manner as when operating in a smaller diameter bore without an adapter. An opening 60 in the front of the adapter 55 permits the piston 44 to move forward as it pushes the penetrator ball 45 into the surface of the inside wall which is to be tested for hardness.

Figure 6 shows the wall of a bolt 62, or other machine element having a bore 63 into which the adapter 55 fits with a running clearance. It will be understood that the hardness tester of this invention can be supplied with as many separate adapters as desired, and that the adapters can be made in sizes representing fairly small changes in diameter or size so that the equipment is suitable for testing any size bore which will be encountered in practice regardless of its shape.

Since it is necessary to use high pressures in making hardness tests by means of ball penetrators, it is essential that the piston 44 fit the cylinder 40 with extreme accuracy to avoid leakage of hydraulic fluid. The accuracy is obtained by making the piston 44 a lap fit within the cylinder 40 and in order to do the necessary machine work for such a fit, it is desirable to have the cylinder 40 extend entirely through the housing 26 so that the cylinder is open at both ends during the lapping process. The rearward end of the cylinder is closed with the plug 42 which is a precision fit in the cylinder, but by making the rearward surface of the plug 42 flush with the outside surface at the back of the housing 26, the force of the hydraulic fluid against the inside face of the plug 42 is fully countered by the pressure of the outside face of the plug 42 against the surface of the bore in which the hardness test is being made.

In the operation of the invention, the apparatus is first subjected to a pre-determined hydraulic pressure. The pressure is then withdrawn, and the apparatus is removed from the bore. The size of the impression made in the wall of the bore by the penetrator ball 45 is then measured by means of an observation device having a light, a mirror and a calibrated microscope by which the wall of the bore can be inspected. Such devices for examining interior surfaces are well known and no illustration is necessary for a complete understanding of this invention.

The amount of pressure used within the cylinder 40 depends upon the nature of the metal being tested, and also upon the relative diameter of the penetrator ball and the cylinder. It is evident that higher unit pressures are obtained by using a smaller diameter of penetrator and a larger diameter for the cylinder 40 when originally designing the apparatus. Experience has shown that very satisfactory results are obtained in steel by using a penetrator ball having a diameter of five millimeters and a cylinder having a diameter of five sixteenths of an inch, with a hydraulic fluid pressure between ten thousand pounds per square inch. The pressure and ball diameter will change with the nature of the metal which is being tested.

The preferred embodiment of the invention has been illustrated and described, but changes and modifications can be made and some features can be used in different combinations without departing from the invention as defined in the claims.

What is claimed is:

1. Hardness testing apparatus comprising an elongated housing for insertion into an opening, a solid head at the forward end of the housing, the head having a bore extending completely therethrough in a direction substantially normal to the longitudial axis of the housing, at least a portion of the bore being a cylinder of uniform diameter, two plugs of the same diameter as one another and closing the opposite ends of the cylinder, both plugs being a precision fit in the cylinder, means for introducing working fluid under pressure into the cylinder between the plugs for direct pressure against the confronting end faces of the plugs, and surfaces on the remote faces of the plugs in position to thrust against diametrically opposite regions of the inside surface of an opening into which the housing is inserted and a penetrator in front of one of the plugs and through which the plug exerts its thrust against the inside surface of the opening.

2. The hardness testing apparatus described in claim 1 and in which there is a penetrator in front of only one of the plugs, and the other plug has an outer surface on its remote face curved for contact with the side wall of the opening into which the housing is inserted, and the axis of curvature of said outer surface extends in the same direction as the longitudinal axis of the housing.

3. The hardness testing apparatus described in claim 1, and in which there is an adapter for use on the apparatus when testing the hardness in an opening of substantially larger diameter than the head, said adapter being generally cylindrical and having an eccentrically located cylindrical opening therein with an axis substantially parallel to the longitudinal axis of the adapter and of a diameter only slightly greater than that of the housing for receiving the housing, the eccentrically located opening being near one side of the adapter and having a branch opening at one side through the next outside surface of the adapter for projection of the penetrator beyond the outside surface of the adapter when the head is located in the adapter with the bore of the head in register with the branch opening in the adapter, and the eccentrically located opening having a surface diametrically opposite to the branch opening and shaped for surface contact with the surface on the remote face of the plug at the end of the cylinder opposite the penetrator.

References Cited in the file of this patent

UNITED STATES PATENTS

| | | |
|---|---|---|
| 2,477,889 | Minix | Aug. 2, 1949 |
| 2,574,342 | Mennesson | Nov. 6, 1951 |
| 2,636,380 | Van Dorn | Apr. 28, 1953 |
| 2,702,946 | Boat | Mar. 1, 1955 |

FOREIGN PATENTS

| | | |
|---|---|---|
| 703,193 | Great Britain | Jan. 27, 1954 |
| 704,290 | Great Britain | Feb. 17, 1954 |
| 845,425 | Germany | July 31, 1952 |